Oct. 6, 1931.  J. E. CHISHOLM  1,826,651
ICE CREAM SCOOP
Filed Sept. 11, 1930  2 Sheets-Sheet 1

Jolliette E. Chisholm
INVENTOR
BY
ATTORNEY

Oct. 6, 1931. J. E. CHISHOLM 1,826,651
ICE CREAM SCOOP
Filed Sept. 11, 1930 2 Sheets-Sheet 2
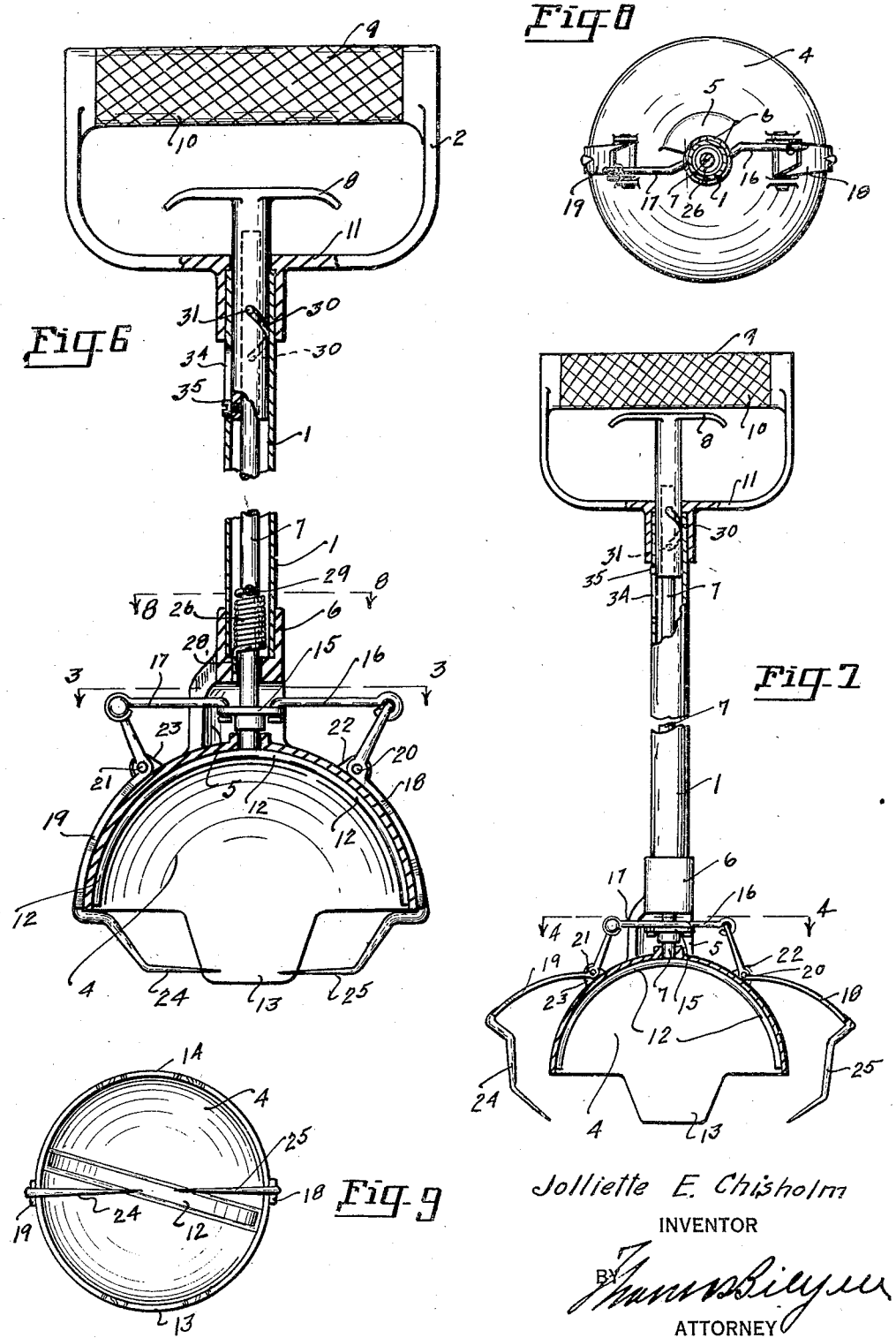
Jolliette E. Chisholm
INVENTOR
ATTORNEY Patented Oct. 6, 1931

1,826,651

UNITED STATES PATENT OFFICE

JOLLIETTE E. CHISHOLM, OF PORTLAND, OREGON

ICE CREAM SCOOP

Application filed September 11, 1930. Serial No. 481,237.

My invention is intended as a dipper and server of frozen confections and more particularly ice cream and frozen ices, its primary object being in the serving and dispensing of frozen confections into cones.

The invention consists primarily of a handled stem having an operating bar disposed longitudinally of the stem and having a head disposed at the lower end of the stem. A handle is disposed at the upper end of the bar for imparting rotation to a shield disposed within the head.

Cutter prongs are disposed adjacent the head for cutting the material to the desired shape and to adapt the same to fit into the cone.

The primary object of my invention is for the dipping and serving of frozen confections from the ice cream can.

A further object of my invention is to provide a dipper and server that will place the frozen confection in an ice cream cone of the desired shape and size and simultaneously therewith, to dip and serve a predetermined measurable amount of the confection material.

A still further object of my invention consists in providing a dipper that eliminates the necessity of the hand and clothing of the user being placed within the can or container into which the frozen confection is delivered to the merchant for dispensing therefrom.

A still further object of my invention consists in providing a simply constructed device that may be easily used and through the use of which expeditious service may be had.

A still further object of my invention is to provide sanitary delivery of the frozen confection from the delivered container to the ultimate consumer.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification:

In the drawings:

Fig. 6 is a fragmentary, sectional, front view of the assembled device, illustrating the cutter prongs in condition for cutting the confection material from the body from which the same is to be taken.

Fig. 7 is a fragmentary, sectional, front view of the mechanism, illustrated in Fig. 6, but illustrating the cutter prongs in position, to permit the delivery of the confection unit from the device.

Fig. 8 is a sectional, plan, view of the mechanism illustrated in Fig. 6, the same being taken on line 8—8 of Fig. 6, looking in the direction indicated.

Fig. 9 is an inverted, plan, view of the head end of the assembled device.

Like reference characters refer to like parts throughout the several views.

Figure 1:
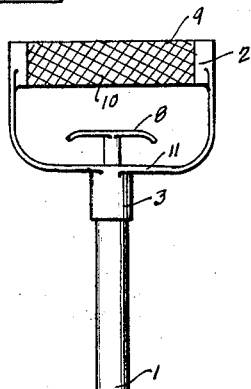
Fig. 1 is a front view of the assembled device.
Figure 3:
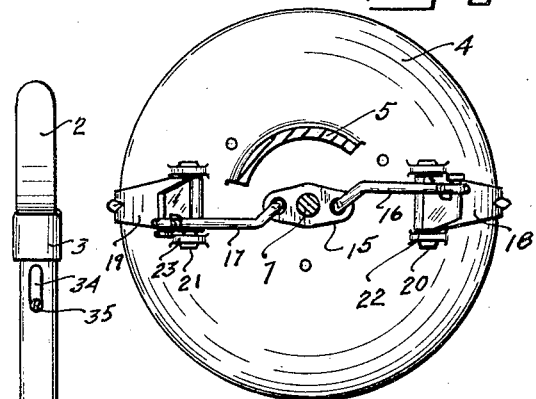
Fig. 3 is a sectional, plan view of the assembled device, the same being taken on line 3—3 of Fig. 6, looking in the direction indicated.
Figure 2:
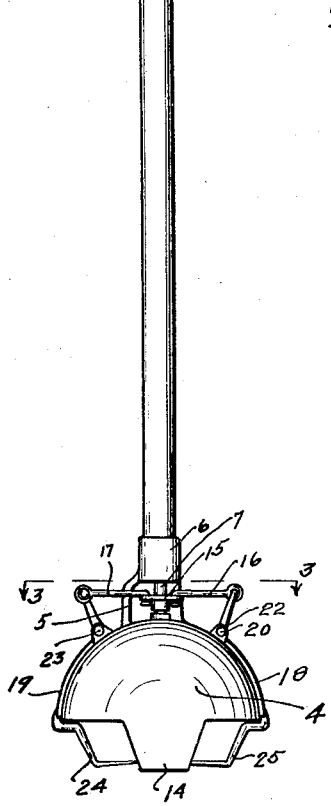
Fig. 2 is a side view of the assembled device.
Figure 4:
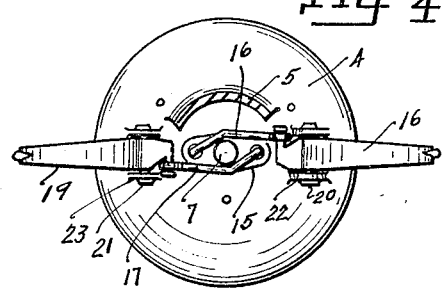
Fig. 4 is a sectional, plan view, of the assembled device, the same being taken on line 4—4 of Fig. 7, looking in the direction indicated.

I preferably form my device of an assembly that adapts itself for the securing of frozen confection from a relatively long can or container, in which it is the custom of the manufacturer to deliver the frozen confection to the merchant.

I provide a hollow stem 1, having a handle 2 disposed at the top thereof. A collar 3 is disposed at the bottom side of the handle, to adapt the handle member to the upper end of the stem. A collar 6 is disposed on the lower end of the stem and a bracket 5 secures the head 4 to the collar 6.

A bar 7 is disposed longitudinally of the stem 1. A hand engaging handle 8 is disposed at the upper end of the bar 7. The handle 8 is normally in registerable alignment with the hand engaging member 9, and normally being in spaced relationship with the under side 10 of the hand engaging member 9 and the inner side 11 of the handle member 2.

A shield 12 is rotatably disposed upon the inner surface of the head 4 and secured to the lower end of the bar 7. Supporting legs 13 and 14, preferably two in number, are downwardly disposed upon the oppositely disposed sides of the head 4.

A lever arm 15 is fixedly secured to the bar 7 between the head 4 and collar 6 and links 16 and 17 are pivotally secured to the lever arm 15.

Cutter bars 18 and 19 are secured upon their one end to their respective companion links 16 and 17 and are rockably disposed about journal pins 20 and 21, which are supported within pairs of ears 22 and 23, that outwardly extend from the outer surface of the head 4.

The cutter bars 18 and 19 have cutter fingers 24 and 25, that are disposed inwardly from the broad surface of the cutter bars 18 and 19 and are made to adapt themselves to the contour of the head 4.

The legs 13 and 14 extend outwardly a greater distance than the fingers 24 and 25, when the fingers are in their normal position.

A reacting element, as a tension coil spring 26 is disposed within the hollow stem 1 and about the bar 7. One end of the spring rests upon a shoulder 28, that is disposed adjacent the lower end of the stem 1 and the oppositely disposed end of the spring is secured within opening 29 disposed within bar 7.

A spirally disposed slot 30 is disposed in the lower outer surface of the handle 8 and a pin 31 is disposed within the slot and secured to the bar 7. The pulling up of the handle 8 by the fingers of the operator rotates the bar 7 which in turn rotates the shield 12 and rocks the cutter bars 18 and 19 about the journal pins 20 and 21 and places the fingers 24 and 25 in position, as illustrated in Fig. 7. The rotation of the shield and rocking of the cutter bars releases the frozen confection from the head.

Figure 5:
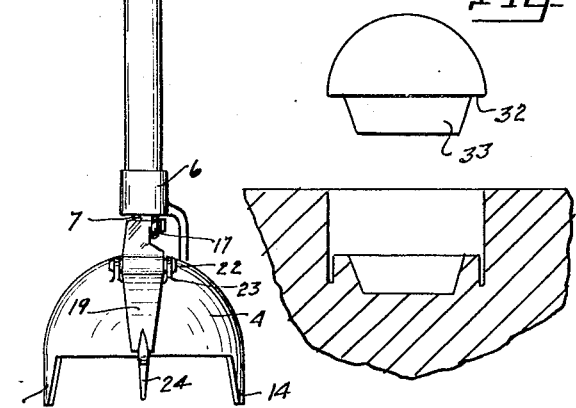
Fig. 5 is a side view, of the confection service to be delivered into the ice cream cone, or for other delivery and illustrating in sectional view, the confection body, from which the same is taken.

The rotation of the bar 7 and the consequent rotation of the shield within the confection mass, cuts the surface of confection on its base, as illustrated in Fig. 5, so that a shoulder 32 is disposed about the base, thus forming a frustaconical base 33 upon the base of a confection unit in order to facilitate its placement in ice cream cones as now made.

A slit 34 is formed in the stem 1 and a locator pin 35 is slidably disposed therein. The locator pin 35 being removably secured to the shank 29 of the handle 8, this maintains the handle 8 and the stem in alignment, when the handle is moved longitudinally within the stem.

The cutter fingers 24 and 25 may be so shaped as to cut the base of the confection unit to any desired shape, to fit the cone or otherwise.

While the form of mechanism herein shown and described, is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, the combination of a hollow stem, a handle and a head disposed upon the oppositely disposed ends of the stem, a bar rotatably disposed within the stem, means disposed within the handle for rotating the bar when moved longitudinally, a shield disposed within the head and secured to the bar and adapted for being rotated when the bar is rotated and cutter bars and fingers pivotally secured to the bar and adapted for being moved about journal pins secured to the head.

2. In a device of the class described, the combination of a hollow stem, a handle and a head secured to the oppositely disposed ends of the stem, a shield disposed within the head, cutter bars and fingers hingedly secured to the head and means for actuating the cutter bars and fingers out of registery with the discharge end of the head.

3. In a device of the class described, the combination of a spindle, a handle disposed upon one end of the spindle and a head disposed upon the oppositely disposed end of the spindle, a bar rotatably disposed longitudinally of the spindle; a shield disposed within the head and secured to the bar; a reacting element disposed within the spindle and about the bar and adapted for maintaining the shield in intimate engagement with the head; a secondary handle disposed within the primary handle and adapted for rotating the bar and shield when moved longitudinally, and cutting fingers pivotally secured to the bar and rockably disposed upon the head and adapted for being actuated when the bar is rotated.

4. In a device of the class described, in combination, a hollow stem, a handle disposed at one end of the stem, a bracket disposed at the other end of the stem, a head attached to the bracket, a bar disposed through the entire length of the stem, a handle slidably disposed about one end of the bar, a shield disposed at the other end of the bar and being in intimate relation with the inner wall of the head, means for maintaining a fixed relationship between the stem and the second mentioned handle, means for rotating the bar when both handles are gripped, means for returning the bar to its normal position when the grip is released, and means disposed upon the bar and the head for releasing and determining the shape of the base of the scooped material.

5. In a device of the class described, in combination, a hollow stem, a handle disposed at one end of the stem, a bracket disposed at the other end of the stem, a head attached to the bracket, sides downwardly extending from the head, a bar rotatably disposed through the stem, a handle slidably disposed about one end of the bar, a shield disposed at the other end of the bar and within the head, means for maintaining a fixed relation between the stem and the second mentioned handle, a spiral slot disposed within the second mentioned handle, a pin secured to the bar and disposed within said groove, means for returning the bar to its normal position, and means disposed upon the bar and the head for determining the shape of and releasing the scooped material.

6. In a device of the class described, in combination, a hollow stem, a handle disposed at one end of the stem, a bracket disposed at the other end of the stem, a head attached to the bracket, a bar rotatably disposed through the stem, a slit disposed through the upper portion of the stem, a handle telescopically disposed about one end of the bar, a shield disposed at the other end of the bar, a locator pin removably secured to the last mentioned handle in registerable alignment with the slit, means for rotating the bar, a reacting element disposed about the lower portion of the bar adapted to return the bar to its normal position, and means disposed upon the bar and the head for determining the shape of and releasing the scooped material.

7. In a device of the class described, in combination, a stem, a handle disposed at one end of the stem, a bracket disposed at the other end of the stem, a head attached to the bracket, a bar disposed through the stem, a handle telescopically disposed at one end of the bar, a shield disposed at the other end of the bar, means for maintaining a fixed slidable relationship between the stem and the second mentioned handle, means for rotating the bar, means for returning the bar to its normal position, a lever arm disposed upon the bar immediately above the head, fingers journaled upon the head, and links connecting said fingers to the lever arm.

JOLLIETTE E. CHISHOLM.